United States Patent [19]

Williams, Jr.

[11] Patent Number: 5,195,769
[45] Date of Patent: Mar. 23, 1993

[54] SLIDING JACK SUPPORT

[76] Inventor: Thomas M. Williams, Jr., 2310 Old Oxford Hwy., Durham, N.C. 27704

[21] Appl. No.: 752,828

[22] Filed: Aug. 30, 1991

[51] Int. Cl.[5] .............................................. B60D 3/00
[52] U.S. Cl. .................................. 280/478.1; 280/477
[58] Field of Search ............ 280/467, 468, 477, 478.1, 280/475, 479.1, 763.1; 254/420, DIG. 1; 384/42, 908

[56] References Cited

U.S. PATENT DOCUMENTS

| | | | |
|---|---|---|---|
| 3,084,953 | 4/1963 | McGregor | 280/150.5 |
| 3,464,882 | 9/1969 | Morton | 384/42 X |
| 3,740,077 | 7/1973 | Williams | 280/477 X |
| 3,765,703 | 10/1973 | Voelkerding et al. | 280/475 X |
| 4,431,208 | 2/1984 | Geeves | 280/475 |
| 4,537,416 | 8/1985 | Linaburg | 254/420 X |
| 4,911,460 | 3/1990 | DePaula | 280/478.1 |
| 4,961,589 | 10/1990 | Faurenhoff | 280/477 X |
| 5,009,444 | 4/1991 | Williams, Jr. | 280/477 |

FOREIGN PATENT DOCUMENTS 1606768 11/1990 U.S.S.R. .................. 384/42

Primary Examiner—Margaret A. Focarino
Assistant Examiner—Victor E. Johnson
Attorney, Agent, or Firm—Olive & Olive

[57] ABSTRACT

A device for supporting and shifting the jack post of a trailer tongue mounted jack comprises a jack post receiving socket mounted on an upper member which slides on a low friction surface located between the upper member and a ground engaging base member, the upper member being temporarily lockable in any of several positions on the base member and having a lever on the base member to facilitate alignment of the components of a trailer hitch with minimum force.

12 Claims, 8 Drawing Sheets

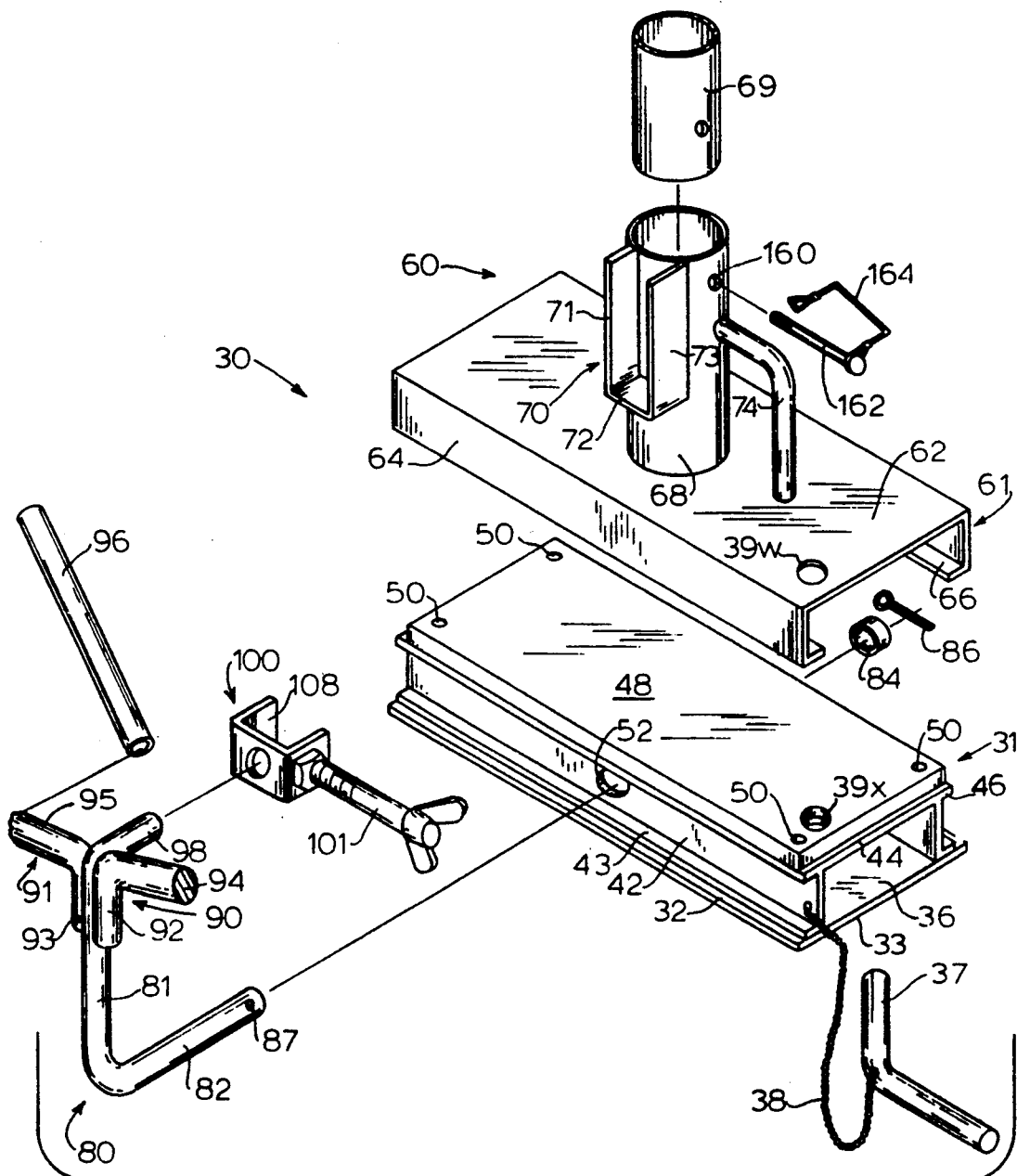
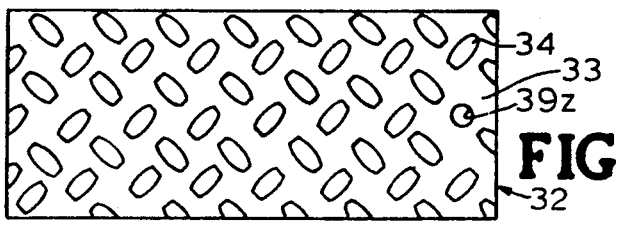
FIG. 1
FIG. 1A

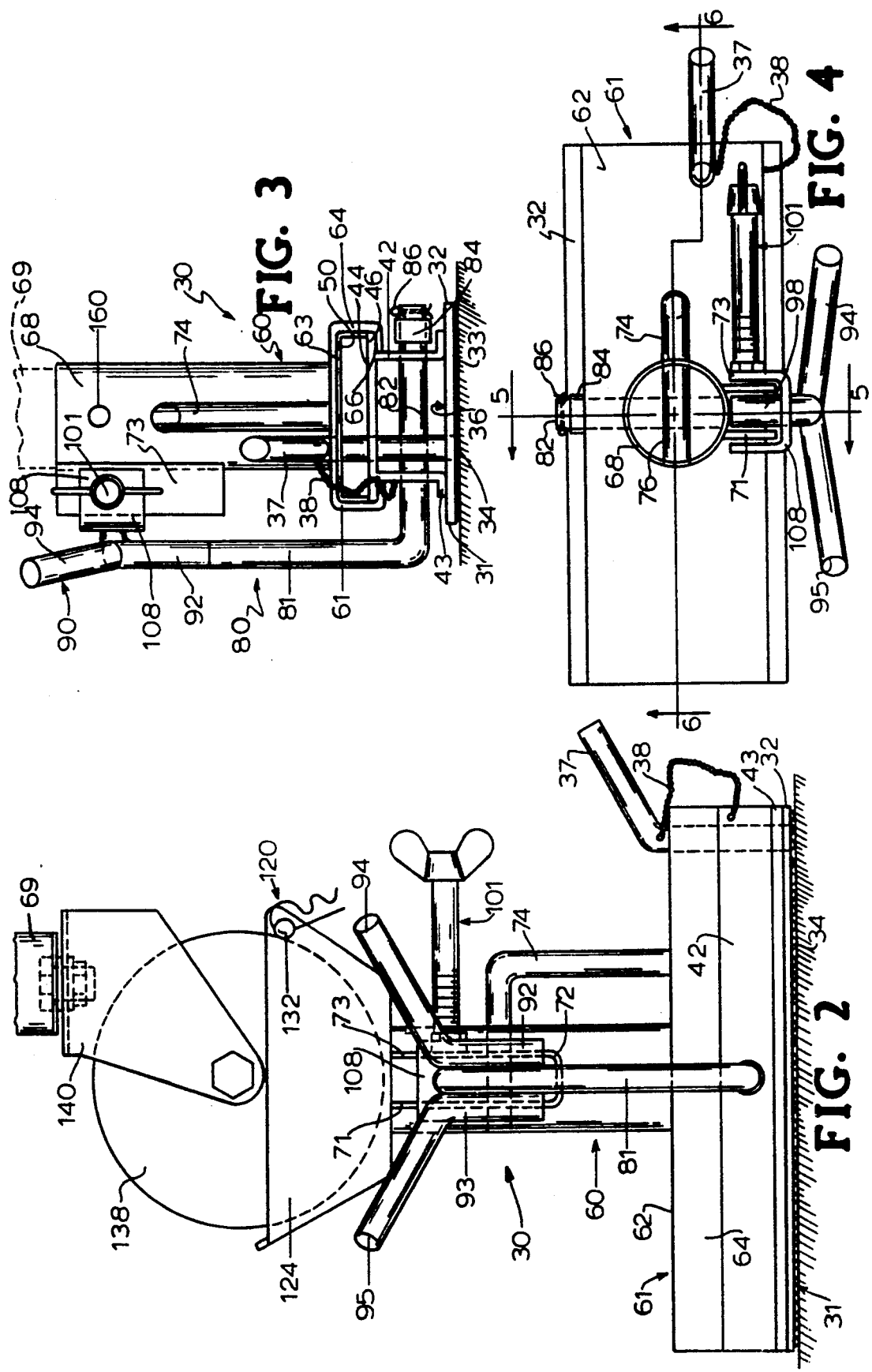

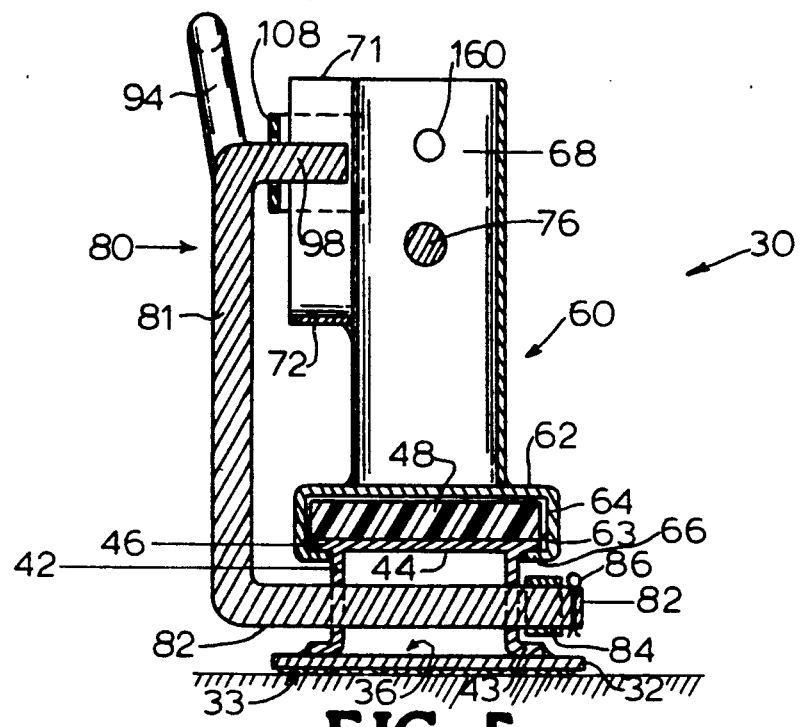
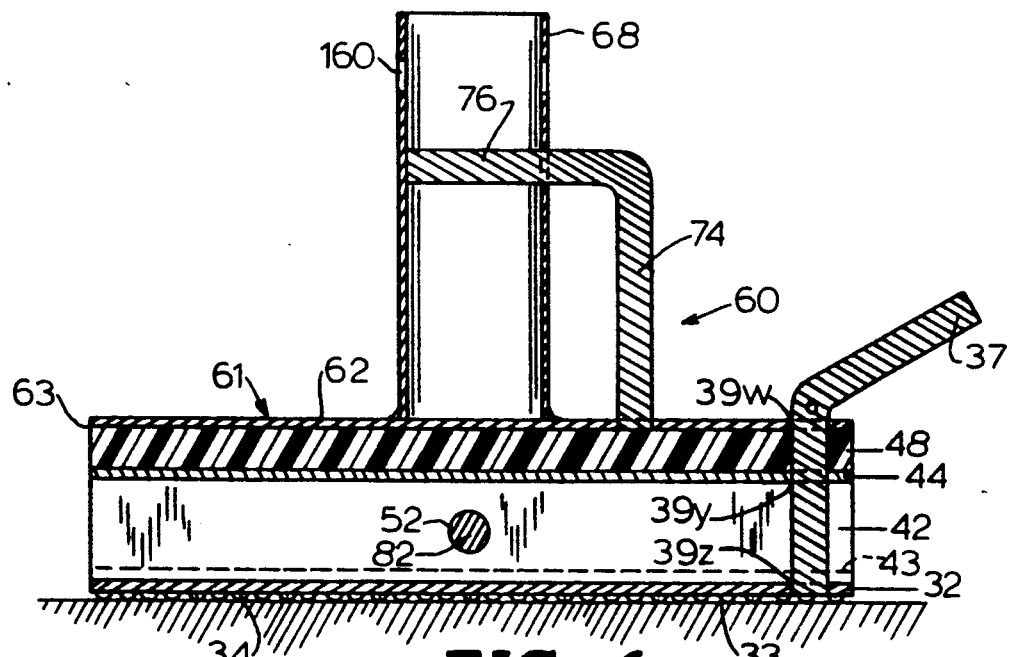

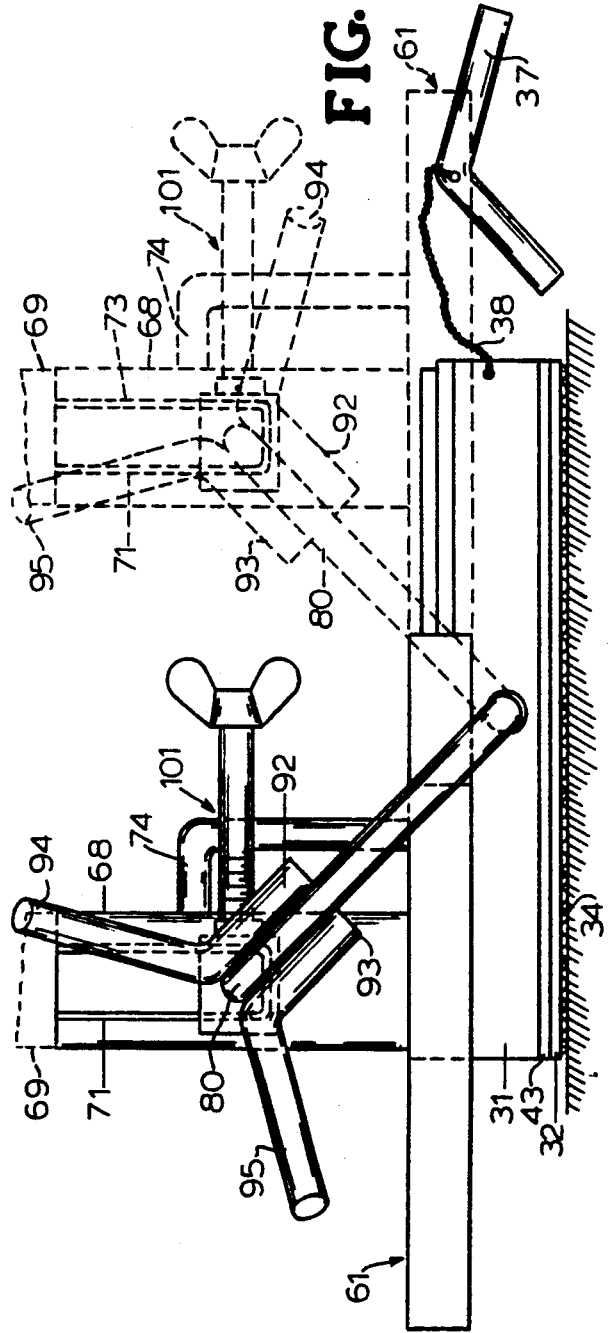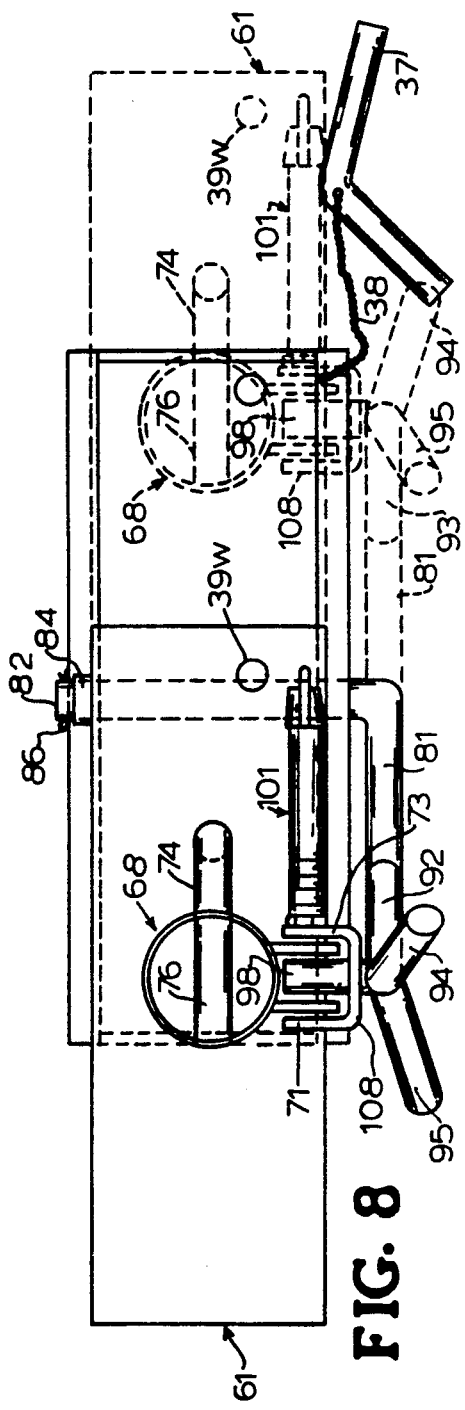

SLIDING JACK SUPPORT

BACKGROUND OF THE INVENTION

1. Field of the Invention

This invention relates to a sliding jack support and particularly to a jack support which supports the jack post of a trailer tongue and permits the trailer tongue to be shifted into alignment with the trailer hitch of a towing vehicle.

2. Description of the Related Art

For purposes of this description, the word "trailer" is meant to refer to any towed vehicle, whether the towed vehicle comprises one unit (e.g., a horse trailer or camper), or whether the trailer is a separate body from the load being supported by it (e.g., a boat on a trailer). Virtually every trailer has a jack post attached to its trailer tongue. On some trailers, the jack post mounts a pivotal wheel. In either case, the jack post is a vertical metal cylinder which is lowered to the ground by a jack and supports the front portion of the towed vehicle when the trailer is not attached to the towing vehicle, for example, when storing the trailer in a garage, or resting it at a campsite. Trailer owners devise a number of methods for providing a base for the jack post to allow it to rest on the ground without penetrating particularly soft ground. For example, trailer owners often rest the jack post on cinder blocks and wood planks. Commercially available metal cone-shaped stands are also used. When the jack post is equipped with a wheel, the wheel may be used to support the jack post on the ground surface, but in soft ground, the wheel is not a satisfactory means of support.

Typically a trailer hitch of the towing vehicle contains a ball, and the trailer tongue of the towed trailer has a socket which fits over the ball of the trailer hitch to attach the trailer to the towing vehicle. Particularly for large or heavily loaded trailers, it is very difficult to maneuver the towing vehicle or the trailer so that the ball and socket are precisely aligned and able to be coupled because it is very difficult to lift or shift the trailer tongue. It is also difficult for the driver of a towing vehicle to precisely align the trailer hitch of the towing vehicle with the trailer tongue of the trailer because the driver cannot see the ball and socket, and therefore cannot maneuver the towing vehicle to meet the trailer tongue. In response to this problem, many devices have been proposed.

Some trailer devices address the alignment problem by providing devices which enable the operator to move the trailer tongue to the ball on the trailer hitch once the towing vehicle has been positioned close to the trailer. However, when using these devices, the operator must physically move and bear the full weight of the trailer tongue in order to move the trailer tongue. For example, U.S. Pat. No. 4,431,208 of Geeves, describes a trailer walker having a handle positioned in a base holding a jack post. The operator must lift and swing the handle of Geeves in order to move the base, which ultimately moves the jack post of the trailer tongue. The operator must also be able to lift much of the tongue weight in order to use the device. Similarly, U.S. Pat. No. 3,084,953 of McGregor describes a trailer device having a positioning track which is placed under a jack wheel of a trailer and which is moved to define a path for moving the trailer. In order to use the positioning track of McGregor, the operator must push or pull the trailer tongue to cause the jack wheel to move in the track. U.S. Pat. No. 4,911,460 of DePaula, describes a device in which the trailer tongue is moved by the turning of a crank. Turning the crank rotates a horizontal lead screw which is engaged to a threaded float carriage located within the socket housing of the jack post to permit the movement of the socket along the lead screw when the crank is turned. The crank of DePaula is very near to the ground and difficult to turn, especially if the load on the trailer tongue is heavy. These devices are effective as alignment devices if the trailer tongue load is moderate. However, the tongue weight of trailers can vary anywhere from 100 pounds to 1000 pounds. For tongue weights of this magnitude, the described devices are generally ineffective.

Applicant's prior U.S. Pat. No. 5,009,444 represents a type of slideable jack stand in which the jack post is received in a socket which is mounted on a ground engaging support and which slides on a low friction surface. While the type of jack stand described in applicant's prior patent represents a significant advance in the art, it has been found to be useful primarily with trailers having a relatively low or medium tongue weight. The sliding jack support of the present invention while incorporating some of the features of the slideable jack stand of applicant's prior patent, seeks to provide a wider range of shifting, greater leverage for the operator to lessen the force required to shift the trailer tongue, and a more versatile locking arrangement enabling the jack post to be locked in any of number of shifted positions.

While other prior art might be cited, it is believed that the cited prior art is sufficient to illustrate the state of the art.

It is therefore an object of the invention to provide a sliding jack support serviceable as a trailer tongue alignment device and which is easy to use with both light and heavy weight tongue loads.

A further object of the invention is to provide a sliding jack support serviceable as a trailer tongue alignment device and which is operable over a relatively wide range without the operator having to exert tremendous force.

Another object of the invention is to provide a sliding jack support which may fix the tongue in any of several laterally shifted positions or in a central position or serve as a fixed jack post support for long term storage, camping or the like.

Other objects and advantages will be more fully apparent from the following disclosure and appended claims.

SUMMARY OF THE INVENTION

The sliding jack support of the invention provides a support for the jack post of a trailer when the trailer is detached from a towing vehicle. The sliding jack support of the invention contains a jack receptacle or socket member which is equipped to receive the lower end of a jack post or, by means of a wheel adapter, is equipped to receive a wheel attached to a jack post.

The sliding jack support of the invention also permits the alignment of the socket on the trailer tongue with the ball on the towing vehicle. The sliding jack support has a lever which moves by means of leverage, the jack post receptacle lengthwise of a ground engaging base member on which the receptacle is slideably supported, thus causing lateral movement of the jack post and the jack receptacle. Due to the sturdy structure of the sliding jack support, the use of a low friction material to support the jack post receptacle, and the use of leverage to cause movement of the trailer tongue, very heavy trailers can be aligned without the exertion of tremendous force by the operator. Means are also provided for releasably locking the jack post receptacle on the base member in a central position or in any of a plurality of shifted positions.

Other aspects and features of the invention will become apparent from the following disclosure and appended claims.

BRIEF DESCRIPTION OF THE DRAWINGS

FIG. 1 is an exploded perspective view of the sliding jack support of the invention, according to a first embodiment, and illustrated without a wheel adapter.

FIG. 1A is a bottom view of the base member shown in FIG. 1.

FIG. 2 is a front elevation view of the assembled sliding jack support of FIG. 1, with an optional wheel adapter shown supporting a wheel fitted jack post and with the base and moving members locked together.

FIG. 3 is a right end elevation view of the assembled sliding jack support of FIG. 1 with a supported jack post shown in dashed lines.

FIG. 4 is a top plan view of the assembled sliding jack support of FIG. 1.

FIG. 5 is a cross-sectional view taken along lines 5—5 of FIG. 4.

FIG. 6 is a cross-sectional view taken along lines 6—6 of FIG. 4.

FIG. 7 is a front view of the assembled device of the first embodiment in an extreme left position shown in solid lines, and laterally shifted to an extreme right position shown in dashed lines, and with a supported jack post also shown in dashed lines.

FIG. 8 is a top plan view of the sliding jack support of FIG. 7 with the extreme left position shown in solid lines, and shifted to an extreme right position shown in dashed lines.

DETAILED DESCRIPTION OF THE INVENTION AND PREFERRED EMBODIMENTS THEREOF

Making reference to the drawings, three embodiments of the invention are illustrated and operate in essentially the same way. They are arbitrarily referred to as the first, second and third embodiments. Each embodiment is comprised of an assembly which includes a base support member which rests on the ground, a moving or upper support member which slides lengthwise of the base member on a low friction surface, a jack support or socket which is supported on the moving member, and a lever mechanism which when pushed or pulled pivots on the base member and through leverage moves the jack support and moving member lengthwise of the base member. The three embodiments differ primarily in the structure of the lever mechanism and the manner in which the lever mechanism engages the jack support to cause movement or shifting of the jack support to perfect alignment of the trailer tongue with the towing vehicle. However, in each embodiment, the pivoting of the lever on the base member results in movement of the moving member on the base member. The resulting line of lateral movement of the jack post is generally parallel to the central longitudinal axis of the base member. At all times during movement, the jack post remains perpendicular to the horizontal plane of the top wall of the base member. In all embodiments, the moving or upper support member has limited movement widthwise while being permitted substantial movement lengthwise of the base member.

Figure 9:
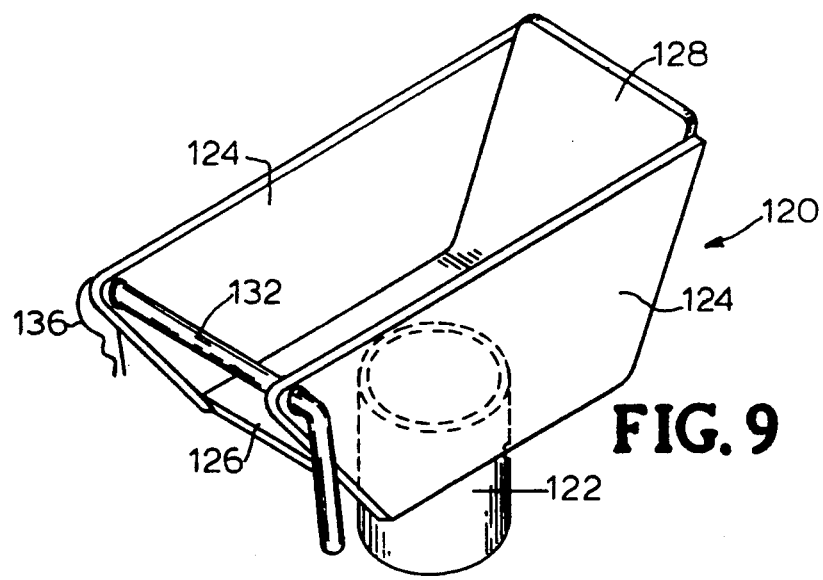
FIG. 9 is a perspective view of the wheel adapter seen in FIG. 2 and which may be used to support the wheel of a wheel fitted jack post in any of the embodiments of the invention.
Figure 9A:
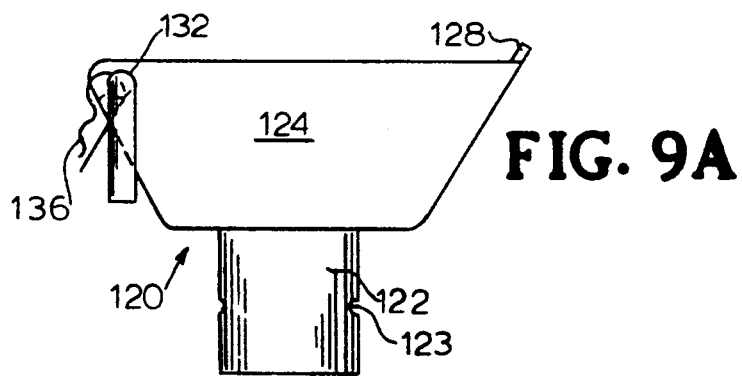
FIG. 9A is a front elevation view of the wheel adapter of FIG. 9.
Figure 9B:
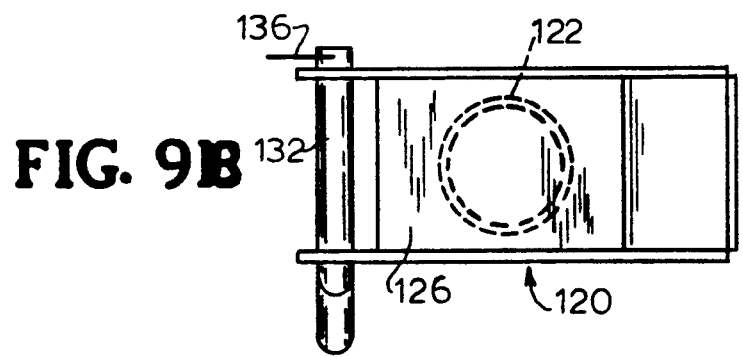
FIG. 9B is a top plan view of the wheel adapter of FIG. 9.
Figure 9C:
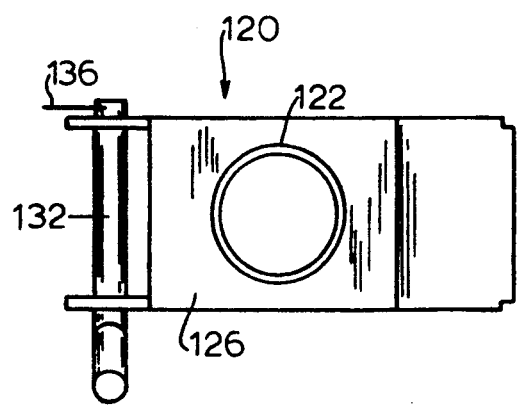
FIG. 9C is a bottom view of the wheel adapter of FIG. 9.
Figure 10:
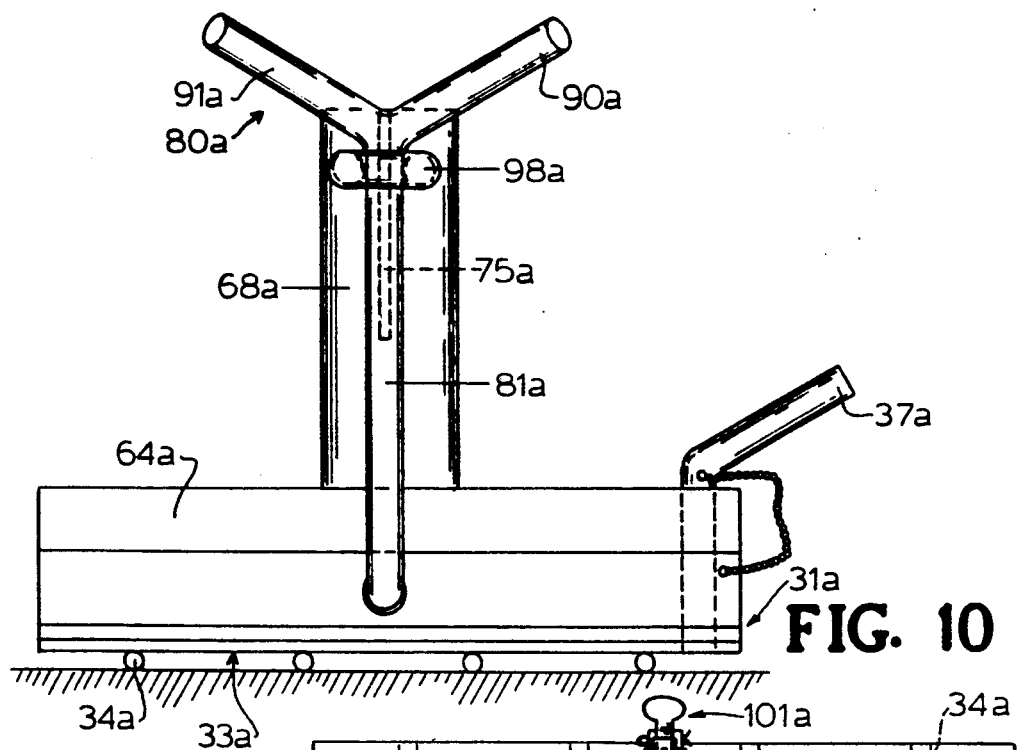
FIG. 10 is a front elevation view of a second embodiment of an assembled sliding jack support of the invention and shown in a locked position.
Figure 12:
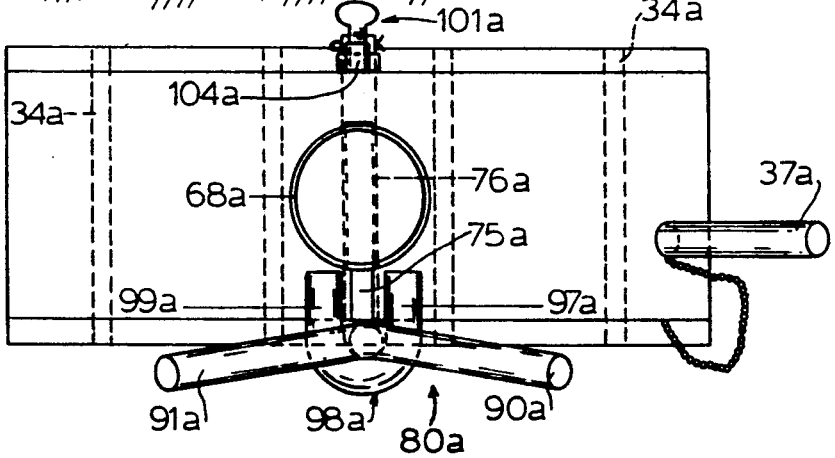
FIG. 12 is a top plan view of the assembled sliding jack support of FIG. 10.
Figure 11:
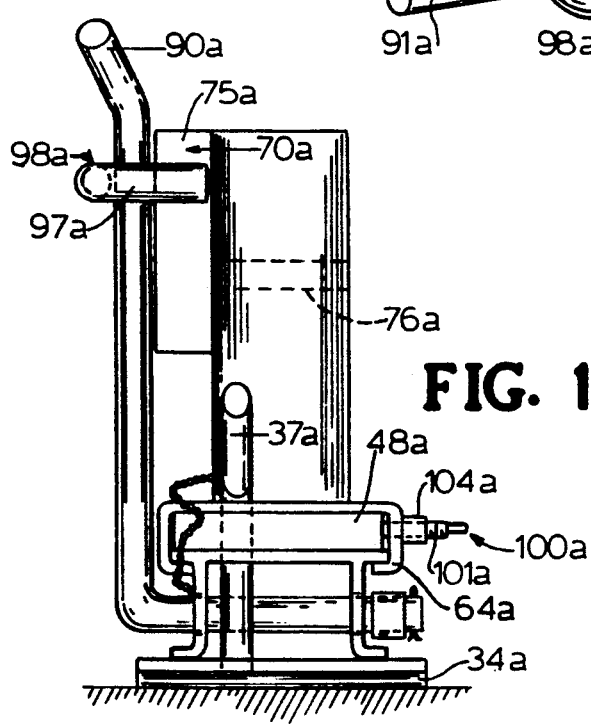
FIG. 11 is a right end elevation view of the assembled sliding jack support of FIG. 10.
Figure 13:
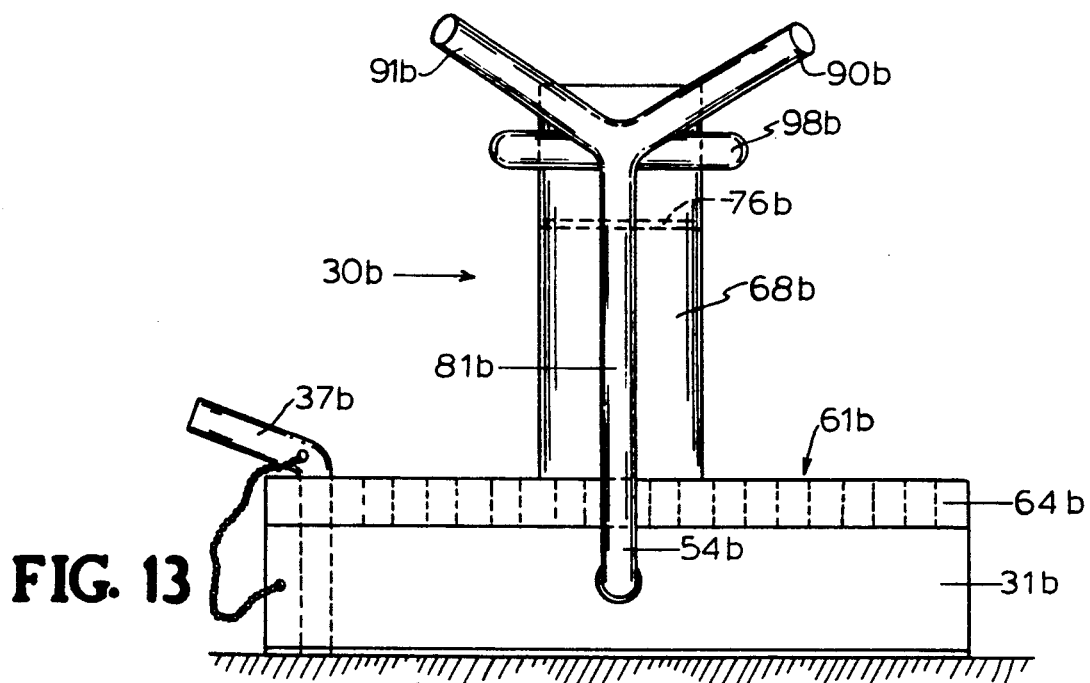
FIG. 13 is a front elevation view of a third embodiment of an assembled sliding jack support of the invention.
Figure 14:
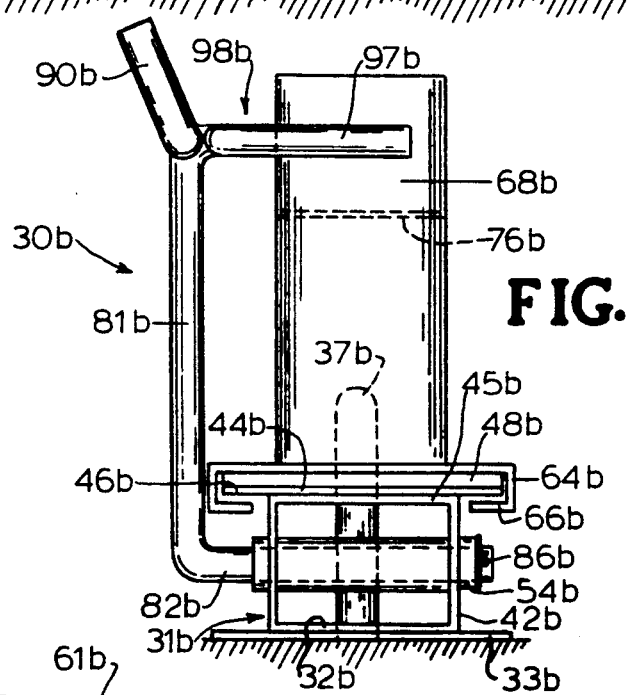
FIG. 14 is a right end elevation view of the assembled sliding jack support of FIG. 13.
Figure 15:
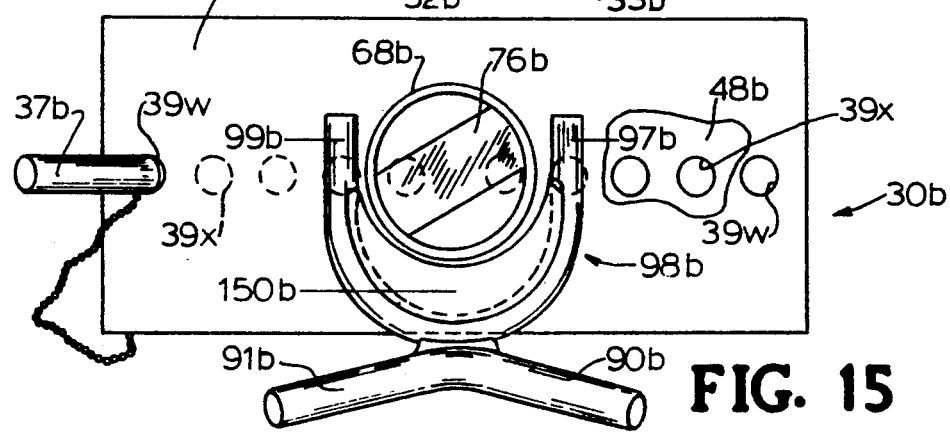
FIG. 15 is a top plan view of the sliding jack support of FIG. 13.

FIGS. 1–8 illustrate a first embodiment of the invention; FIGS. 10–12 illustrate a second embodiment; and FIGS. 13–15 illustrate a third embodiment. FIGS. 9, 9A, 9B and 9C illustrate an optional wheel adapter which may be used with all of the referred to embodiments of the invention. The description will primarily describe and use the first embodiment as a basic reference. Features contained in the other embodiments which are different, will be discussed and indicated when the comparable feature in the first embodiment is discussed. For ease of reference, the description will refer to three positions for the sliding jack support of the invention. "Resting position" will refer to the sliding jack support being in a centrally aligned position, as shown in front elevation view in FIGS. 2, 10 and 13. The terms "extreme right position" and "extreme left position" will be used to refer to positions right and left of the vertical center axis of the jack support in resting position.

Sliding jack support 30 of the invention, according to the first embodiment shown in FIGS. 1–8, comprises a base member 31, a moving member 60 and a lever assembly 80. Base member 31, moving member 60 and lever assembly 80, as also applies to other metal components of the sliding jack support 30, are preferably constructed of a heavy metal, such as steel, to provide a sturdy and substantial support for the various trailer tongue weights intended to be supported. Virtually all parts of sliding jack support 30, except low-friction surfaced plate 48, 48a and 48b are constructed of metal.

Base member 31, shown disassembled from jack support 30 in FIG. 1, is generally rectangular in shape and contains a base plate 32 which has a bottom ground engaging surface 33 and an upper surface 36, both of which are generally rectangular, flat surfaces. Ground engaging surface 33 typically rests on the ground when jack support 30 is in use. Ground engaging surface 33 may contain raised and somewhat sporadically positioned portions 34, shown in FIG. 1A to increase ground friction to further secure jack support 30 to the ground. Another means for increasing ground friction is illustrated in FIGS. 10–11 in which a plurality of steel rods 34a are welded to a base plate 32a and which extend across the width of the ground engaging surface 33a as seen in FIG. 12.

Continuing with the description of the first embodiment as illustrated in FIGS. 1–8, vertical side walls 42 and appended horizontal flanges 43 extend for the length of base plate 32. Flanges 43 are secured to upper surface 36 by welding or other appropriate means. Top plate 44 is supported by side walls 42, is generally perpendicular to side walls 42 and is parallel to base plate 32. Top plate 44 thus has and provides an elevated, flat, horizontal, rectangular upper surface and extends over side walls 42 to form lips 46. Top plate 44, side walls 42 and flanges 43 together form a single extruded piece welded to upper surface 36 of base plate 32.

A pair of oppositely disposed holes form lever receptacles 52, shown generally in FIGS. 1 and 6 and are centrally located lengthwise of side walls 42 to permit the insertion of base portion 82 of lever assembly 80. Lever receptacles 52 correspond in shape to base portion 82 of lever assembly 80 to permit the pivotal attachment of lever assembly 80 in base member 31.

A low friction surface is provided by plate 48 which is attached to top plate 44. Low friction surfaced plate 48, generally rectangular in shape, generally corresponds to the length and width dimensions of top plate 44. The thickness of plate 48 may vary but should be sufficient to allow adequate movement of moving member 60 across the low friction surface provided by plate 48. Plate 48 may be of any appropriate low friction material such as, for example, material sold under the marks TEFLON TM or DELRIN TM. The low friction surfaced plate 48 may be attached to top plate 44 by any conventional means so long as the attachment means indicated at 50 (shown in FIGS. 1 and 3) do not extend above plate 48. Attachment means 50 are shown in FIG. 1 as rivets. It should be appreciated that the low friction surfaced plate 48 may also be attached to moving member 60 on its inside surface 63. The low friction surface provided by plate 48 may be comprised of any conventional means for reducing friction between two surfaces. For example, ball bearings supported in a grooved surface may provide a low friction surface similar to the low friction surface provided by plate 48.

In order to lock moving member 60 relative to base member 31, there is provided a bent pin member 37 referred to as lock pin 37 and which serves to temporarily lock moving member 60 on base member 31 when the two members are properly aligned for receiving lock pin 37. Lock pin 37 may be of a variety of shapes, but is shown in FIGS. 1–2 and 6–8 as a cylindrical metal rod bent slightly substantially at its center point. Lock pin 37 is suitably attached to base member 31 by means of a lock chain 38 which is attached to lock 37 at its center point and to side wall 42 of base member 31 as shown. In use, hole 39w (FIG. 1) in moving member 60 is aligned with hole 39x (FIG. 1) in plate 48, and with holes 39y and 30z (FIG. 6) in base member 31. Lock pin 37 is then inserted in the aligned holes 39 as in FIGS. 2–3 and 6 which shows moving member 60 and base member 31 temporarily locked in resting position. A series of alignable holes 39 may extend lengthwise of the base member 31 and moving member 60 to releasably lock jack support 30 in any of a number of lateral positions. Such a series is illustrated on the third embodiment in FIG. 15 showing holes 39w in moving member 61b and holes 39x in low friction surfaced plate 48b.

Together base plate 32, side walls 42, flanges 43, top plate 44 and low friction surfaced plate 48 form base member 31 of the first embodiment. Third embodiment 30b, shown generally in FIGS. 13–15, comprises a slightly different base member 31b. Base member 31b is comprised of an extruded metal tube having a bottom wall 32b, side walls 42b, and top wall 45b, shown in FIG. 14. An additional base plate 33b (FIG. 14) may be welded to bottom wall 32b on base member 31b to widen the ground engaging surface of base member 31b. In the third embodiment, top plate 44b attaches to top 45b and forms lips 46b shown in FIG. 14. Low friction surfaced plate 48b is secured to top plate 44b. The manner in which lever assembly 80b is mounted on base member 31b also differs in the third embodiment. Lever assembly 80b is inserted into tubing 54b which extends perpendicularly through the center of side walls 42b, parallel to base plate 31b and top plate 44b, shown in FIG. 14.

Referring once again to the first embodiment (FIGS. 1–8), moving member 60 comprises sliding piece 61, and jack receptacle or socket 68. Sliding piece 61 has top wall 62, side walls 64 and extensions 66 (FIG. 1) and generally surrounds and engages lips 46 and plate 48 of base member 31, shown in FIGS. 3 and 5 which limits widthwise movement of top wall 62 on which receptacle 68 is supported. Inside surface 63 (FIG. 3) of sliding piece 61 abuts and slides on low friction surfaced plate 48, illustrated in FIGS. 5 and 6.

Moving member 61 may include an optional handle grip 74. FIGS. 1, 2, 6 and 7 show handle grip 74 as a bent rod attached to top 62 and to jack receptacle 68, preferably by welding. Handle grip 74 may extend through jack receptacle 68 to act as a stop bar 76 (FIG. 4) to limit the depth of insertion of the jack post 69.

Jack post receptacle or socket 68 is a cylindrical member, attached to sliding piece 61 by welding, although any conventional method providing sufficient attachment may be utilized. Jack receptacle 68 is adapted to house vertically adjustable jack post 69 of a trailer jack as shown in FIGS. 1, 3 and 7. The height of jack receptacle 68 may vary, but preferably permits a sufficient portion of jack post 69 to be inserted so that jack post 69 is secure in receptacle 68. Jack receptacle 68 may contain jack post pin 162 to secure jack post 69 in receptacle 68 shown disassembled in FIG. 1. Jack post pin 162 is inserted into jack post pin holes 160 and through jack post 69 and is secured by locking clip 164 which generally surrounds jack receptacle 68 when in locked position.

Stop bar 76 (FIGS. 5, 6 and 8), attached inside jack receptacle 68, serves as a stop for jack post 69 when jack post 69 is inserted into jack receptacle 68. The distance into which stop bar 76 is placed into jack receptacle 68 may vary; however, the distance from the top of jack receptacle 68 to stop bar 76 should be sufficient to brace jack post 69 securely in jack receptacle 68. In the first and second embodiments, stop bars 76 (FIGS. 5 and 8) and 76a (FIG. 12) are shown as rods; in the third embodiment, stop bar 76b (FIG. 15) is shown as a welded in flat plate having curved sides to conform to the curvature of jack receptacle 68. It is appreciated that a number of configurations of stop bar 76 may be utilized to accomplish the result.

An optional wheel adapter 120 may be utilized for trailers having a jack post 69 fitted with a wheel 138 in a wheel bracket 140 as shown in FIG. 2. Base cylinder 122 of wheel adapter 120 (FIGS. 9 and 9A) is inserted into jack receptacle 68 and may be secured by inserting jack post pin 162 (FIG. 1) in holes 160 in receptacle 68 and mating holes 123 (FIG. 9A) in cylinder 122. When wheel adapter 120 is in use and wheel 138 rests on bottom surface 126 (FIG. 9B), the wheel is generally cradled by three vertical sides side panels 124 and back side 128. An open fourth side is enclosed by guard pin 132 (FIGS. 9, 9A, 9B and 9C). Guard pin 132 is inserted through the illustrated pin receptacles and is secured by means of a clip pin 136. Wheel 138 may of course be rolled from wheel adapter 120 by removing guard pin 132.

Jack receptacle 68 is formed with an engaging structure 70, shown in FIG. 1, which is engaged by engaging member 98 of lever assembly 80 when lever assembly 80 is pivoted on base member 31. Engaging structure 70 is comprised of vertical left wall 71, vertical right wall 73 and base wall 72 as shown in FIG. 1. Vertical walls 71 and 73 are parallel to the vertical center axis of jack receptacle 68 and are generally perpendicular to the outside surface of jack receptacle 68, shown in FIG. 1. Vertical walls 71 and 73 are spaced a distance apart and joined by horizontal wall 72 to form a generally U-shaped integral structure 70. Walls 71, 72 and 73, are attached to jack receptacle 68 by welding, but any conventional attachment means could be utilized so long as an adequate attachment is achieved. The inwardly projecting engaging member 98 of lever assembly 80 moves within walls 71, 72 and 73 when lever assembly 80 is pivoted on base member 31 and causes receptacle 68 and corresponding jack post 69 to shift lengthwise of the base member 31 or laterally with respect to the trailer tongue as in FIG. 6.

In the second embodiment as seen in FIGS. 10-12, the engaging structure 70a is formed by a single vertical wall 75a extending outwardly from and secured by welding or the like to the outer surface of the receptacle 68. Engaging member 98a of lever assembly 80a may engage either side of vertical wall 75a when lever assembly 80a is pivoted to the right or left on base member 31a to shift receptacle 68a. In the third embodiment shown in FIGS. 13-15, the engaging structure comprises the jack receptacle 68b itself. Engaging member 98b of lever assembly 80b thus engages and shifts jack receptacle 68b whenever lever assembly 80b is pivoted on base member 31b.

Referring once again to the first embodiment, lever assembly 80, shown in FIGS. 1-8, has horizontal base portion 82 which is inserted into and through base member 31 through lever receptacles 52. To secure lever assembly 80 in base member 31, washer 84 is inserted onto the outer end of base portion 82 once base portion 82 is inserted into base member 31; cotter pin 86 is inserted into cotter pin hole 87 (FIG. 1). In the third embodiment, base portion 82b is inserted into tubing 54b (FIG. 14) and is secured by a cotter pin 86b.

Referring once again to the first embodiment, center portion 81 of lever assembly 80 extends perpendicularly and upward from base portion 82 to a height approximately equal to jack receptacle 68, at which point center portion 81 bends in approximately a right angle toward jack receptacle 68 and forms engaging member 98. At this top portion of lever assembly 80, lever assembly 80 is formed with a right handle 90 and a left handle 91 (FIG. 1). Handles 90 and 91 are comprised of respective vertical portions 92 and 93 and angled portions 94 and 95 (FIGS. 2 and 7). Vertical portions 92 and 93 are welded to center portion 81. Angled portions 94 and 95 form approximately 135° angles (FIG. 2) with vertical portions 92 and 93 respectively and may be skewed slightly outward from base member 31 as best seen when viewed from above in FIG. 4. This slight outward angle enables handles 90 and 91 to clear the trailer tongue and the wheel adapter 120 (if utilized) when lever assembly 80 is pivoted on base member 31, but it is not always necessary. The outward angle should not be such as to cause a significant backward force when lever assembly 80 is pivoted on base member 31. Handle extension 96 (FIG. 1) is placed on handle 90 or 91 to extend angled portions 94 and 95 and to assist the operator in exerting more leverage on lever assembly 80 when pivoting lever assembly 80 on base member 31.

Figure 16:
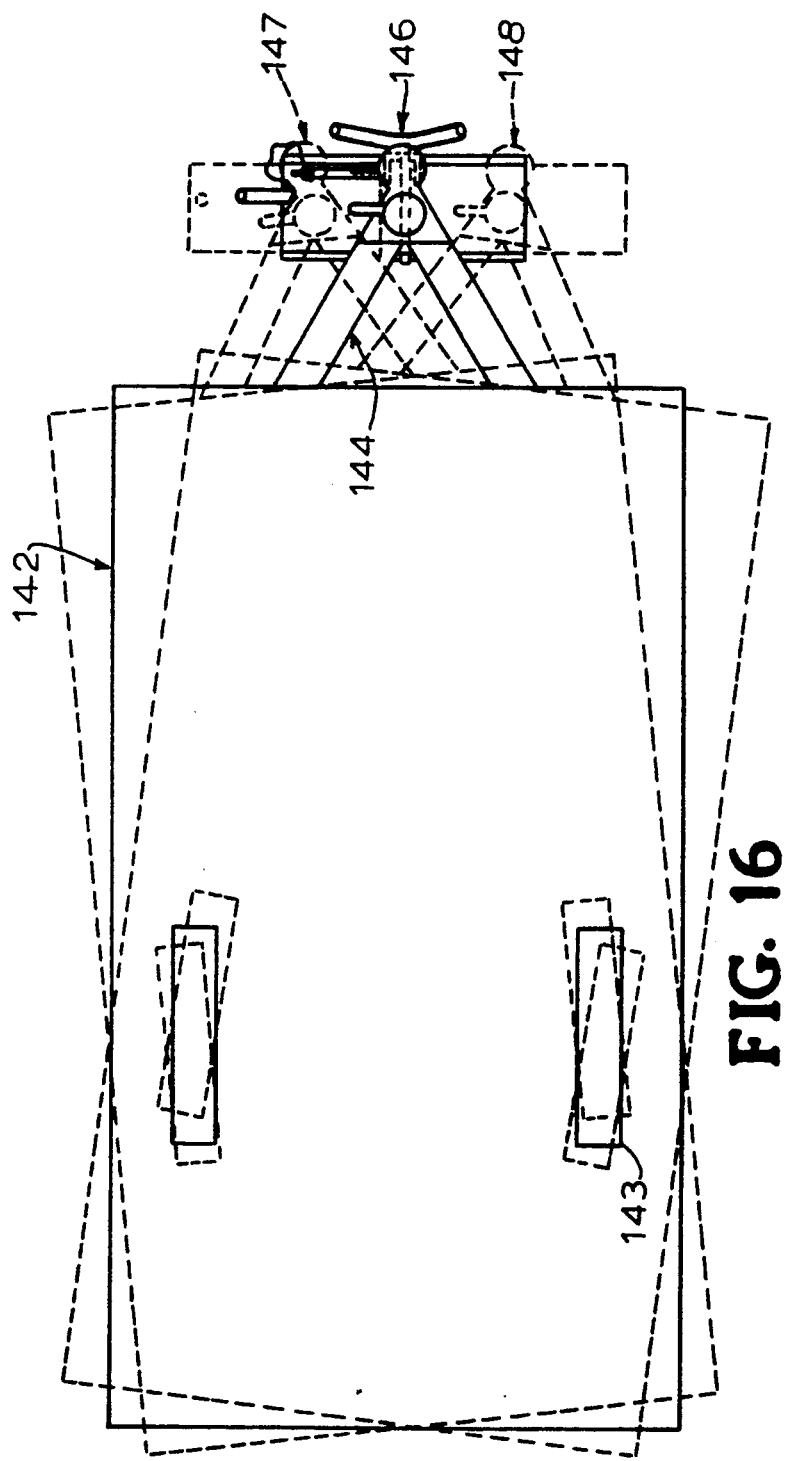
FIG. 16 is a schematic top plan view illustrating trailer and trailer tongue movement through use of the sliding jack support of the invention, showing the trailer and its tongue when the sliding jack support is in extreme right and extreme left positions from a resting position; the resting position being shown in solid lines, and the extreme right and left positions being shown in dashed lines.

The manner in which the lever assembly 80 of the first embodiment causes movement of moving member 60 along base member 31 will now be discussed. Locking pin 37 is removed. Handle extension 96 when placed on right handle portion 94 and pushed downward or when placed on left handle portion 95 and pulled upward causes receptacle 68 to shift to the right as viewed in FIG. 8. Similarly, handle extension 96 may be placed on left handle position 95 and pushed downward or placed on right handle portion 94 and pulled upward to cause movement to the left as viewed in FIG. 8. Whether to place handle extension on handle portion 95 or 94 will depend on whether the operator wishes to exert leverage on lever assembly 80 by pushing or by pulling. In some instances for example, if the jack receptacle 68 is in the extreme right position, handle extension 96 will more easily be placed on left handle portion 95 to cause left movement because the ground may be too close to handle portion 94 for the easy placement of handle 96 onto handle portion 94. FIG. 7 and 8 illustrate sliding jack support 30 in extreme left position (shown in solid lines) and in extreme right position (shown in dashed lines) without handle extension 96. FIG. 16 illustrates the lateral movement of trailer 142, trailer wheel 143, and trailer tongue 144 in resting position 146, extreme left position 148 (shown in dashed lines) and extreme right position 147 (also shown in dashed lines).

The pivotal rotation of lever assembly 80 on base member 31 causes engaging member 98 on lever assembly 80 to move vertically down jack receptacle 68 within vertical walls 71 and 73, and to abut either vertical walls 71 or 73 to force movement of jack receptacle 68 to the left or right. The maximum distance for right and left movement may vary with the different lengths of base member 31. In determining the maximum distance for lateral tongue movement, jack receptacle 68, when supporting the weight of the trailer tongue, must not be permitted to slide off of the support of base member 31. Horizontal wall 72 thus limits travel and ensures that lever assembly 80 does not force such movement beyond such maximum safe distance. Horizontal wall 72 thus halts engaging member 98 from its vertical movement along jack receptacle 68, thereby defining a maximum distance that lever assembly 80 may be pivoted. In the first and second embodiments, the distance from resting position to extreme right or left positions, in one example, was approximately five (5) inches. In the third embodiment, in another example, this distance was approximately four (4) inches.

Referring next to FIGS. 10-12 and movement of the second embodiment assembly, right handle 90a and left handle 91a shown in FIGS. 10 and 13, are formed as one integral piece with center portion 81a. Engaging member 98a (FIGS. 11 and 12) is a generally U-shaped member which surrounds lever assembly 80a and extends to jack receptacle 68a. Engaging member 98a is attached to lever assembly 80a by welding or other appropriate means. Engaging member 98a has right prong 97a and left prong 99a which surround vertical wall 75a. When lever assembly 80a is pivoted to the right of resting position, left prong 99a engages and is pushed against vertical wall 75a causing right movement as viewed in FIG. 12. When lever assembly 80a is pivoted left, right prong 97a engages and is pushed against the opposite side of vertical wall 75a, to cause left movement as viewed in FIG. 12. A maximum distance of movement is defined as follows. Right prong 97a acts as a right stop for movement of vertical wall 75a when left prong 99a pushes against vertical wall 75a. Similarly, left prong 99a acts as a left stop for movement of vertical wall 75a when right prong 97a pushes against vertical wall 75a. In this manner, lever assembly 80a is prevented from further pivotal rotation. The maximum pivoting distance for lever assembly 80a generally correlates to the lateral distance between prongs 97a and 99a and which defines the opening in engaging member 98a.

Referring now to the movement of the third embodiment, right handle 90b and left handle 91b of the third embodiment, shown in FIGS. 13 and 15, are formed by a unitary piece which is attached by welding, or other appropriate means to lever assembly 80b. Engaging member 98b, also welded to lever assembly 80b, is generally U-shaped and comprises right prong 97b and left prong 99b and which generally surrounds jack receptacle 68b shown in FIGS. 14 and 15. Guard 150b, shown in FIG. 15, closes the depth of the U-curve in engaging member 98b. With lock pin 37b removed, when lever assembly 80b is pivoted to the right of resting position, left prong 99b engages and is pushed against the left side of jack receptacle 68b to cause right movement as viewed in FIG. 15. When lever assembly 80b is pivoted to the left of resting position, right prong 97b engages the right side of jack receptacle 68b to cause a corresponding left movement as viewed in FIG. 15.

Various means are provided for temporarily locking the jack support of the invention in a position other than resting position. Not only may the series of alignable holes 39 be utilized; other types of temporary locks are also contemplated. Referring again to the first embodiment, temporary lock 100 permits the operator of the sliding jack support 30 to align the jack receptacle 68 appropriately with the towing vehicle and to secure that position while the operator leaves jack support 30 to further move the towing vehicle, if necessary. Temporary lock 100 may be made in any of several variations but operates to temporarily stabilize moving member 60 on base member 31, in a position other than resting position. Temporary lock 100 as illustrated, comprises wing screw 101 on U-shaped enclosure 108 (FIGS. 1-4). Enclosure 108 generally surrounds vertical walls 71 and 73 and engaging member 98, so that when screw 101 is rotated into enclosure 108, vertical wall 73 is engaged by screw 101, thus preventing further vertical movement of enclosure 108 and engaging member 98 along vertical wall 71.

In a second embodiment, shown in FIG. 11, temporary lock 100a comprises wing screw 101a in internally threaded lock receptacle 104a located on and welded to side wall 64a. When screw 101a is rotated and screwed into lock receptacle 104a, screw 101a passes through a mating hole formed in side wall 64a and engages plate 48a as best seen in FIG. 11 so as to prevent the further movement of sliding piece 61a on base member 31a.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A sliding jack post support assembly for use with a trailer having a tongue and a trailer jack on the tongue fitted with a vertically adjustable jack post having a lower end and adapted when engaged with the jack post lower end to support and adjust the trailer tongue with respect to a towing vehicle, said sliding jack post support assembly comprising:
    (a) a base support member having a ground engaging support portion and a first elevated flat horizontal rectangular wall;
    (b) an upper support member having a second elevated flat horizontal rectangular wall positioned for being supported by and for moving longitudinally of said first wall in a plane parallel thereto, a socket member opening upwardly of said second wall with a base portion supported on said second wall and dimensioned to receive and support the lower end of a trailer tongue jack post forming part of a trailer, and means for limiting widthwise movement of said second wall on said first wall;
    (c) friction reducing means interposed between said first and second walls providing a low friction sliding support for said second wall on said first wall;
    (d) lever means mounted on said base support member adapted for engaging a selected portion of said upper support member and by lever action forcing limited longitudinal sliding movement of said second wall on said first wall to thereby force corresponding limited longitudinal sliding movement of said jack post when mounted in said socket member; and
    (e) wherein said lever means comprises a lever member having a first portion mounted for pivoting on said base support member, a second integral portion located on one side of and above said base support member and adapted to releasably receive a handle member providing leverage for operating said lever member and a third integral portion extending from said second portion and adapted to slidably engage a selected portion of said socket member.

2. A sliding jack post support assembly as claimed in claim 1 including means for temporarily locking said upper support member on said base support member in a selected position.

3. A sliding jack support assembly as claimed in claim 1 including a jack post wheel receptacle adapted to mount in said socket member for receiving a wheel mounted on a lower end of a jack post fitted to a trailer jack to thereby support said jack post by supporting said wheel.

4. A sliding jack post support assembly as claimed in claim 1 including means for releasably securing said upper support member to said base support member in any of a selected plurality of positions.

5. A sliding jack post support assembly as claimed in claim 1 including a handle and means for releasably securing said lever member third portion to said socket member guide means.

6. A sliding jack post support assembly as claimed in claim 5 wherein said lever member second portion is formed to receive said handle in either of two opposed positions enabling said upper support member to be moved by said handle when received in either of said positions.

7. A sliding jack post support assembly as claimed in claim 2 wherein said base support member and upper support member are formed with vertical holes which may be aligned when in a selected locking position and said means for temporarily locking said upper post support member on said base member comprises a locking pin insertable in said vertical holes in said selected locking position.

8. A sliding jack post support assembly as claimed in claim 2 wherein said base support member and upper support member are each formed with plural vertical holes one of which in each member may be aligned with another hole in the other member enabling said upper support member to be temporarily locked in any position corresponding to an aligned set of said holes.

9. A sliding jack post support assembly as claimed in claim 1 wherein said friction reducing means comprises a plate of low friction surfaced material secured to said base member between said first and second walls.

10. A sliding jack post support assembly as claimed in claim 1 including means for releasably locking said lower end of said jack post to said socket member.

11. A sliding jack post support assembly as claimed in claim 1 including means limiting longitudinal sliding movement of said second wall on said first wall comprising surface forming means secured to said socket member and positioned to be engaged by a selected portion of said lever means to limit said movement.

12. A sliding jack post support assembly as claimed in claim 1 wherein said socket member is formed with guide means for receiving and slidably engaging said lever member third portion.

* * * * *